(12) United States Patent
Espax et al.

(10) Patent No.: US 6,373,433 B1
(45) Date of Patent: Apr. 16, 2002

(54) APPARATUS AND METHOD FOR GENERATING TRANSMITTER ANTENNA WEIGHTS

(75) Inventors: Francesc Boixadera Espax, Chatenay Malabry; Yann Farmine, Vaux sur Seine; Nicholas Whinnett, Paris, all of (FR)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/489,320

(22) Filed: Jan. 21, 2000

(30) Foreign Application Priority Data

Mar. 12, 1999 (EP) .............................. 99400609

(51) Int. Cl.[7] ............................. H01Q 3/22; H01Q 3/24; H01Q 3/26
(52) U.S. Cl. ......................... 342/368; 342/373
(58) Field of Search ................... 342/368, 373

(56) References Cited

U.S. PATENT DOCUMENTS

| | | | |
|---|---|---|---|
| 5,515,378 A | 5/1996 | Roy, III et al. | 370/95.1 |
| 6,067,324 A | * 5/2000 | Harrison | 375/267 |
| 6,141,393 A | * 10/2000 | Thomas et al. | 375/347 |

FOREIGN PATENT DOCUMENTS

| | | |
|---|---|---|
| EP | 0595247 A1 | 10/1993 |
| EP | 0786914 A | 7/1997 |
| EP | 0786914 A2 | 7/1997 |
| EP | 0869647 A | 10/1998 |
| GB | 2313261 A | 11/1997 |

OTHER PUBLICATIONS

Loyka S. L and Mordachev V I: "On Applications of Self–Phased Array Antennas to Mobile Communications" Proceedings Rawcon 98 1998 IEEE Radio and Wireless Conference, 9–12 Aug. 9–12 1998, pp. 233–236, XP002110333 Colorado Springs, USA *P. 235, Line 9–15; Figure 3*.

* cited by examiner

Primary Examiner—Theodore M. Blum
(74) Attorney, Agent, or Firm—Daniel K. Nichols

(57) ABSTRACT

Antenna weights for a transmit path (3) between two communication devices (1, 2), the first device (1) having an antenna array (4, 5, 6) are generated in the second device (2) and fed back to weighting circuitry (9, 10, 11, 12) in the first device (1). The invention is particularly applicable to multicarrier systems such as OFDM systems. Only weights for those sub-carriers identified as being received with comparatively poor signal quality are calculated and fed back to the first device (1), thus limiting the additional overhead requirements to a minimum.

10 Claims, 1 Drawing Sheet

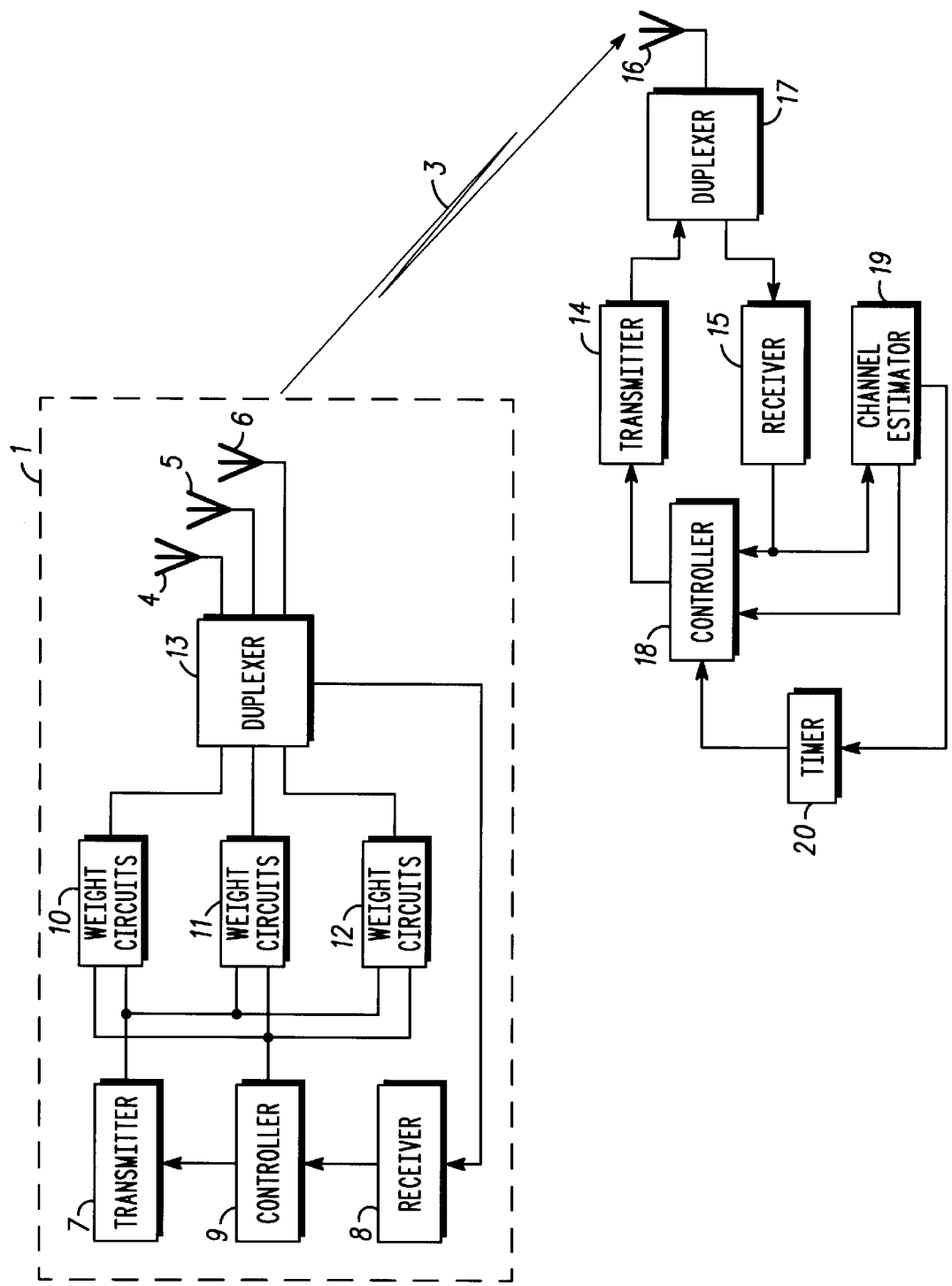

APPARATUS AND METHOD FOR GENERATING TRANSMITTER ANTENNA WEIGHTS

TECHNICAL FIELD

This invention relates to communication systems employing antenna arrays and has particular application to multi-carrier communications systems such as those employing orthogonal frequency division multiplexing (OFDM) modulation.

BACKGROUND OF THE INVENTION

Antenna arrays have a plurality of antennas used to communicate radio frequency signals through wireless communication links. Antenna arrays provide improved performance relative to a single antenna by providing a better antenna pattern for a coverage area.

Even with an antenna array to provide an improved antenna pattern, signals communicated between communication devices are subject to interference. Buildings, hills and other objects produce multi-path wave propagation and communication devices and energy sources introduce noise, resulting in errors in the signals communicated between communication devices.

To reduce these errors, techniques have been developed to optimise the received path of a communication device employing an antenna array. By varying the weight of the signals detected by each of the individual antennas in the array, it is possible to vary the antenna pattern to better detect signals from a particular direction or to arrange for non-destructive combination of multi-path signals. These techniques adjust the weights of the antenna array signals to maximise the receive path gain by measuring the output of a receiver.

Other techniques are known whereby optimum weights are provided for the transmit path. For example, Applicant's co-pending application no. GB-A-2313261 discloses a method of weighting a transmit path of a communication station 'A' which is equipped with an antenna array. A method includes the steps of transmitting reference signals from each antenna in the array to a communications station B and calculating at station B weighting information based on a comparison of the incoming reference signals with stored reference signals. The calculated weighting information is then transmitted from station B to station A whereupon a controller in station A adjusts the antenna weights based on the received weighting information.

Thus, a feedback mechanism as described above can be implemented to provide optimised transmission settings for each antenna comprising the array.

However, applying such a scheme to a wide-band multi-carrier system (e.g., OFDM) which operates in frequency selective channels, results in a large overhead. A large overhead may prove unacceptable in certain systems.

It is further known that for high data transmission rates, the channel frequency response becomes frequency selective i.e. the phase and amplitude characteristics vary with frequency within the total band occupied by a transmitted signal. Therefore, in systems employing transmitting antenna arrays and multicarrier modulation, sub-carrier frequency-dependent weights have to be used, thereby increasing the overhead still further.

In the particular case of frequency division duplex (FDD) where up-link and down-link transmit on different carrier frequencies, a feedback weighting scheme is required. However, again, large amounts of overhead are required in order to transmit the reference signals in one direction and subsequently, the frequency-dependent weighting information in the other direction for every separate subcarrier (in a multicarrier FDD system).

SUMMARY OF THE INVENTION

This invention aims to provide a method and apparatus for reducing this overhead whilst maintaining most of the achievable gain.

In a first aspect, the present invention comprises: apparatus for generating antenna weights for a transmit path of a first communication device, said first communication device including an antenna array, in which the apparatus includes, in a second communication device, a receiver for receiving multi-carrier signals comprising a plurality of sub-carriers transmitted from the antenna array over a plurality of sub-bands, means for measuring a parameter of the received signals for each sub-carrier comprising each sub-band, means for identifying at least one sub-band including a sub-carrier whose measured parameter meets a predetermined criterion, a transmitter for transmitting to the first communication device a request for a reference signal in said identified sub-band, and calculating means for calculating antenna weights for each sub-carrier included in said identified sub-band from an analysis of said reference signal.

In a second aspect, the present invention comprises a method for generating antenna weights for a transmit path of a first communication device, said first communication device including an antenna array, in which the method includes the steps of;

in a second communications device, receiving multi-carrier signals comprising a plurality of sub-carriers transmitted from the antenna array over a plurality of sub-bands, measuring a parameter of the received signals for each sub-carrier comprising each sub-band, identifying at least one sub-band including a sub-carrier whose measured parameter meets a predetermined criterion, transmitting to the first communication device a request for a reference signal in the identified sub-band, receiving from the first communication device a reference signal in the identified sub-band, and calculating antenna weights for each sub-carrier included in said identified sub-band by analysis of the reference signal.

The calculated weights may be transmitted from the second communication device to the first communication device whereupon weight circuits in the first communication device may be utilised to set the antenna weights for each sub-carder to optimise the transmit path.

Hence, the second communication device generates feedback information in order to maximise the quality of the signal it receives from the first communication device.

The second communication device may be provided with an antenna array or a single antenna.

The multi-carrier signals transmitted over a plurality of sub-bands may comprise OFDM signals and the reference signals may comprise pilot symbols.

The measured parameter may be, for example, received signal quality and those sub-carriers with received quality falling below a pre-set threshold may be identified and the sub-band to which they belong, probed by transmission of the requested reference signals. Antenna weights may be calculated by one of several appropriate known techniques. For example, the reference signals may be correlated with a local stored reference to give an estimate of the gain and phase of the transmit path.

By probing only those sub-bands where received signal quality could be improved, the total transmission overhead is reduced.

As antenna weight values for only selected sub-bands may be calculated and fed back to the first communication device, the computational overhead is kept low and the transmission overhead is reduced still further.

Different criteria of signal quality can be used to derive the optimum weights depending on the system embodiment e.g. received power or signal to interference ratio among multiple communication units if they all share the same frequency.

In order to limit the number of bits of information representing the antenna weight values to be fed back to the first communication device, compression algorithms may be used. Another option for minimising the amount of information fed back may involve determining sub-optimal weights.

Means for identifying sub-bands (a sub-band being defined as comprising a group of sub-carriers which are all affected by the channel in substantially the same way) may comprise means for estimating the channel response of the transmit path.

In one embodiment, the second communication device is provided with means for estimating a coherence time for the transmit path. (Coherence time being defined as a length of time during which the properties of a channel are constat). These parameters can be either programmed into the second communication device or periodically estimated from the signals received from the first communication device. Knowing the coherence time, the second communication device can set a preferred update rate. This update rate specifies how often the second communication device requests the reference signals to be sent and how often it feeds back the antenna weights. The update rate may be set at an optimised value taking into account the coherence time, and the available capacity of the communications link between the first and second communication devices.

Consequently, the second communication device may incorporate at least one timer circuit, each being associated with each sub-band, and set in order to avoid re-probing recently probed sub-bands before transmit path characteristics are expected to change. The countdown settings of each timer circuit may be derived from the coherence time.

In the context of OFDM communication systems, the invention provides the advantage of requiring less transmitter power for the same quality of service. This can also result in reduced interference, more efficient frequency re-use and/or range increases.

Further, the average number of subcarriers transmitted at each antenna is statistically reduced. Hence peak to average power requirements for transmitter amplifier can be reduced.

More capacity in one direction of the communications link between first and second communication devices can be obtained but at the expense of capacity in the other direction.

In systems incorporating spatial diversity, specifications for coding or inter-lacing can be relaxed.

Significant improvements can be achieved with very little extra overhead for low delay spread environments which create significantly wide notches.

One particularly useful application of the invention is in wireless local area networks in which servers are equipped with multiple transmitting antennas and the clients use single antenna transceivers.

A further application of the invention is to broadband transmissions which could be a combination of OFDM and other types of multiple access coding such as code division multiple access.

BRIEF DESCRIPTION OF THE DRAWINGS

The FIGURE is a block diagram of a communication system in accordance with the present invention.

DETAILED DESCRIPTION OF THE PREFERRED EMBODIMENT

An embodiment of the invention will now be described, by way of example only, with reference to the drawing which is a schematic block diagram of a communication system incorporating antenna weight generating apparatus in accordance with the invention.

With reference to the drawing, a communication system includes a first communication device 1 and a second communication device 2 that communicate over a communication link 3. Each communication device 1, 2 can comprise for example, a wireless modem, a cellular radio telephone, a cordless radio telephone, a two-way radio, a base station or the like.

The communication devices communicate with each other using an OFDM multicarrier modulation scheme. In OFDM, a complex signal is formed from a summation of subcarriers (of different frequencies) onto which parallel data bits have been modulated. The transmit path comprising the communications link 3 from communication device 1 to communication device 2 will have a characteristic channel response which will affect the amplitude and phase of each sub-carrier transmitted from communication device 1 in a particular way. This channel response may also vary with time.

The first communication device 1 is provided with an antenna array comprising three antennas 4, 5 and 6. Although three antennas are shown here, the array may equally comprise less or more than three antennas.

The first communication device 1 further includes a transmitter 7, a receiver 8 and a controller 9. The controller 9 can be implemented using a microprocessor, a digital system processor, a programmable logic unit, a computer or the like. The controller 9 controls the operation of the transmitter 7. The transmitter 7 and the receiver 8 are implemented using any suitable commercially available circuitry for wireless OFDM communications.

An output of the transmitter 7 is connected to three transmit path weight adjusters, 10, 11 and 12. Each of the transmit weight adjuster is in turn connected to a respective one of antennas 4, 5 and 6 via a duplexer circuit 13. The transmit path weight adjusters weight the signals output by the transmitter according to a control signal received from the controller 9 and apply a weighting appropriate for each sub-carrier. The duplexer circuit 13 can be implemented using any suitable duplexing device, a switch circuit, a filter or the like. The duplexer circuit 13 connects the antennas to the transmit and receive paths to provide full duplex or half duplex operation.

Each transmit path weight adjuster 10, 11 and 12 is configured in accordance with known practice and applies the appropriate weight to every sub-carrier.

(The weighting process may be carried out jointly with the modulation process in the transmitter 7).

The second communication device 2 includes a transmitter 14 and a receiver 15 connected to an antenna 16 via a duplexer circuit 17. The transmitter 14 and receiver 16 are also connected to a controller 18. The transmitter 14 and the receiver 15 are implemented using any suitable commercially available circuitry for wireless OFDM communications. The controller 18 is implemented using a microprocessor, a digital system processor and programmable logic unit or the like. An output receiver 15 is connected to a channel estimator 19 which supplies sub-channel identity information to the controller 18. The channel estimator also supplies a measure of the channel coherence time to a timer 20. An output of the timer 20 is connected to the controller.

The controller 18 is adapted to calculate the optimum weights for the transmit weight adjusters, 10, 11, 12 of communication device 1 based on reception of probe signals sent to communication device 2 via the antenna array 4, 5, 6 comprising communication device 1. Any one of several suitable methods can be used for calculating the weights. For example, calculations based on received signal quality are applicable.

In operation, communication is established in accordance with known procedures between the first and second communication devices 1 and 2. Both devices 1 and 2 transmit and receive OFDM modulated signals to and from each other.

Additionally, communication device 2 transmits to communication device 1 feedback information for maximising the quality of the signals it receives from communication device 1.

In addition to the OFDM modulated transmitted signals transmitted from the communication device 1, transmitter 7 is configured to generate probe symbols for reception and analysis by the second communication device 2. These are fed to each antenna 4, 5 and 6 in the array via the controller 9 and weight adjusters 10, 11 and 12. These probing symbols enable the controller 18 in the second communication device 2 to determine the optimum weight for each subcarrier transmitted. This determination can be done by one of several known techniques. For example, the controller 18 can calculate the optimum weights based on the received reference signals levels for each of the antennas 4, 5 and 6 and for each sub-carrier that is probed. An optimum weight vector can be calculated from the received signal gain and phase. The complex conjugate of the complex representation of the estimated gain and phase from each antenna can be used as the weight for each antenna. The estimated gain and phase for each antenna is obtained in the controller 18 by correlation of the reference signals received with a local copy of the predetermined reference signals stored. The result of the correlation between the signals indicates the estimated gain and phase of the transmission path 4, 5 and 6 for each sub-band. Alternatively, a code book can be used to choose a preferred weight vector from a candidate list. This can be done by selecting the vector from the code book that is closest to the optimum weight vector as calculated from the complex conjugate of the estimated received phase and gain. Alternatively, the preferred weight vector is chosen to maximise the received signal power in each sub-band at the receiving communication device 2.

The controller 18 in communication device 1 firstly analyses, for each sub-carrier, the quality of a received signal burst transmitted by the communication device 1. It then selects those sub-carriers whose received signal quality is comparatively poor. The channel estimator 19 estimates the channel response of the transmit path by analysis of the received OFDM signal bursts. From this channel response, specifically the frequency response, the values of the bandwidth of transmitted sub-bands are computed and fed to the controller 18. The controller 18 then identifies those sub-bands containing the selected sub-carriers having poor quality. It then sends a signal via the transmitter 14 to the communication device 1 requesting probing signals on just one sub-carrier in each selected sub-band.

The transmitter 7 in communication device 1 responds appropriately by transmitting probing signals comprising pilot symbols in order to probe the communication link 3 for all the antennas 4, 5 and 6 in the sub-bands specified by communication device 2.

On receipt of the probing signals at communication device 2, the controller 18 determines the preferred weight vector to be applied by weight circuits 10, 11 and 12 for each probed sub-band. These weights are transmitted from the controller 18 via the transmitter 15 to the communication device 1, whereupon the controller 9 and weighting circuits 10, 11, 12 in communication device 1 act to set the antenna weights accordingly. All the sub-carriers in a sub-band have the same weight adjustment applied to them. As just one weight adjustment value for each sub-band rather than for every selected sub-carrier is fed back to communication device 1, the transmission overhead can be kept low.

The process can be repeated as necessary.

The channel estimator 19 also computes a coherence time for the transmit path (by any appropriate conventional method) and feeds this information to the timer 20. The timer 20 has a plurality of circuits which then set the update rates for the controller 18 which dictates how often the controller 18 requests reference signals and how often it feeds back the weight adjustment information for each sub-band. The time between updates does not need to be any shorter than the coherence time of course, as the channel characteristics remain constant over this period (for each sub-band). Other factors influencing update rate can be the capacity of the communications link 3 and this information can be initially programmed into the timer.

The steps comprising the operation recited above with respect to the figure need not necessarily occur in succession. For example, the second communication device 2 may feedback at the same time, the antenna weight values and the request for the next set of reference signals in the identified sub-band.

If it is desired to reduce the transmission overhead further still, then not all the weighting information for all the identified sub-bands needs to be fed back from the second communication device 2 to the first 1. For instance, just the sub-band containing the most badly affected sub-carrier(s) could be processed. As further resources become available, e.g. an improvement in link capacity, more and more identified sub-bands could be processed.

What is claimed is:

1. Apparatus for generating antenna weights for a transmit path of a first communication device, said first device including an antenna array for transmitting signals including a reference signal in which the apparatus includes, in a second communications device a receiver for receiving multi-carrier signals comprising a plurality of sub-carriers transmitted from the antenna array over a plurality of sub-bands, means for measuring a parameter of the received signals for each sub-carrier comprising each sub-band, means for identifying at least one sub-band including a sub-carrier whose measured parameter meets predetermined criterion, a transmitter for transmitting to the first communication device a request for a reference signal in said identified sub-band, and calculating means for calculating antenna weights for each sub-carrier included in said identified sub-band from an analysis of said reference signal.

2. Apparatus as claimed in claim 1 in which the measured parameter is received signal quality.

3. Apparatus as claimed in claim 1 in which the calculating means is adapted to calculate the antenna weights by reference to a correlation of the reference signals with a stored signal.

4. Apparatus as claimed in claim 1 in which the means for identifying sub-bands comprises a channel estimator for estimating the frequency response of the transmit path.

5. Apparatus as claimed in claim 1 and further including a timer for controlling the frequency of a transmission of the request for a reference signal.

6. Apparatus as claimed in claim 1 and further including means for estimating the coherence time of the transmit path.

7. Apparatus as claimed in claim 1 and further including means for transmitting the calculated antenna weights to the first communication device.

8. Apparatus as claimed in claim 7 and including a timer (20) for controlling frequency of the transmission of the calculated antenna weights.

9. A method for generating antenna weights for a transmit path of a first communication device, said first communication device including an antenna array in which method includes steps of;

in a second communications device, receiving multi-carrier signals comprising a plurality of sub-carriers transmitted from the antenna array over a plurality of sub-bands, measuring a parameter of the received signals for each sub-carrier comprising each sub-band, Identifying at least one sub-band including a sub-carrier whose measured parameter meets a predetermined criterion, transmitting to the first communications device a request for a reference signal in the identified sub-band, receiving from first communications device a reference signal in the identified sub-band, and calculating antenna weights for each sub-carrier included in said identified sub-band by analysis of the reference signals.

10. A method as claimed in claim 9 and including the further step of transmitting the antenna weights to the first communications device.

* * * * *